US006954821B2

United States Patent
Fitzsimmons et al.

(10) Patent No.: US 6,954,821 B2
(45) Date of Patent: Oct. 11, 2005

(54) CROSSBAR SWITCH THAT SUPPORTS A MULTI-PORT SLAVE DEVICE AND METHOD OF OPERATION

(75) Inventors: Michael D. Fitzsimmons, Austin, TX (US); William C. Moyer, Dripping Springs, TX (US); Brett W. Murdock, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 250 days.

(21) Appl. No.: 10/631,167

(22) Filed: Jul. 31, 2003

(65) Prior Publication Data

US 2005/0027920 A1 Feb. 3, 2005

(51) Int. Cl.[7] .............................................. G06F 13/00
(52) U.S. Cl. ...................................... 710/317; 710/240
(58) Field of Search ........................... 710/38, 100, 110, 710/113–116, 240–244, 121, 309, 316, 317

(56) References Cited

U.S. PATENT DOCUMENTS

| | | | | |
|---|---|---|---|---|
| 5,854,906 A | * | 12/1998 | Van Loo ..................... | 710/110 |
| 5,890,007 A | | 3/1999 | Zinguuzi | |
| 5,901,295 A | * | 5/1999 | Yazdy ........................ | 710/113 |
| 6,378,029 B1 | | 4/2002 | Venkitakrishnan | |
| 6,480,927 B1 | | 11/2002 | Bauman | |
| 6,701,397 B1 | * | 3/2004 | Foster et al. ................ | 710/107 |
| 6,715,023 B1 | * | 3/2004 | Abu-Lebdeh et al. ....... | 710/317 |

FOREIGN PATENT DOCUMENTS

WO    WO 02/15021    2/2002

OTHER PUBLICATIONS

Sobalvarro, P.G.; "Analytical Modeling of Multistage Multipath Networks"; IEEE Tansansactions on Parallel and Distributed Systems; Oct. 1996; pp 1059–1064; vol. 7, No 10; IEEE.

Wang, M.; "Using a Multipath Network for Reducing the Effects of Hot Spots"; IEEE Transactions on Parallel and Distributed Systems; Mar. 1995; pp 252–268; vol. 6, No. 3; IEEE.

\* cited by examiner

Primary Examiner—Khanh Dang
(74) Attorney, Agent, or Firm—Robert L. King

(57) ABSTRACT

A crossbar switch (12) arbitrates for access from multiple bus masters (14, 16, 18, 20 and 22) to multiple addressed slave ports (3 and 4) that have overlapping address ranges. In one form, the address ranges are the same address range. The crossbar switch (12) uses shared slave port control circuitry (48), configuration registers (46) and slave port arbiter logic (34, 36, 38, 40, 42 and 44) to arbitrate for access when all the addressed ports are busy. A determination is made as to whether new access requests are higher or lower in priority than existing accesses. A determination on where to direct a new access request is made based upon a prediction of which of certain multiple accesses will complete first based on various factors including the number of data beats requested as well as wait state information. In one mode, the wait state information is determined dynamically.

26 Claims, 5 Drawing Sheets

MEMORY MAP
{
SLAVE PORT 0 : 0x0000_0000 - 0x1FFF_FFFF
SLAVE PORT 1 : 0x2000_0000 - 0x4FFF_FFFF
SLAVE PORT 2 : 0x5000_0000 - 0x5FFF_FFFF
SLAVE PORT 3 : 0x6000_0000 - 0x6FFF_FFFF (SHARED)
SLAVE PORT 4 : 0x6000_0000 - 0x6FFF_FFFF (SHARED)
}

| CSSPCR | CROSSBAR SHARED SLAVE PORTS CONTROL REGISTER | | | | | | | | | | | | | | | |
|---|---|---|---|---|---|---|---|---|---|---|---|---|---|---|---|---|
| BIT | 31 | 30 | 29 | 28 | 27 | 26 | 25 | 24 | 23 | 22 | 21 | 20 | 19 | 18 | 17 | 16 |
| NAME | MP7 | | MP6 | | MP5 | | MP4 | | MP3 | | MP2 | | MP1 | | MP0 | |
| BIT | 15 | 14 | 13 | 12 | 11 | 10 | 9 | 8 | 7 | 6 | 5 | 4 | 3 | 2 | 1 | 0 |
| NAME | SIZE | | | | PAGES | | | | SSP | | | | | | | |

*FIG. 4*

| SPWSPC | SLAVE PORT WAIT-STATE PREDICTION CONTROL | | | | | | | | | | | | | | | |
|---|---|---|---|---|---|---|---|---|---|---|---|---|---|---|---|---|
| BIT | 31 | 30 | 29 | 28 | 27 | 26 | 25 | 24 | 23 | 22 | 21 | 20 | 19 | 18 | 17 | 16 |
| NAME | | | SLV9WS | | SLV8WS | | | | SLV7WS | | | | SLV6WS | | SLV5WS | |
| BIT | 15 | 14 | 13 | 12 | 11 | 10 | 9 | 8 | 7 | 6 | 5 | 4 | 3 | 2 | 1 | 0 |
| NAME | | | SLV4WS | | SLV3WS | | | | SLV2WS | | | | SLV1WS | | SLV0WS | |

*FIG. 5*

CROSSBAR SWITCH THAT SUPPORTS A MULTI-PORT SLAVE DEVICE AND METHOD OF OPERATION

BACKGROUND

1. Field of the Invention

This invention relates generally to semiconductors, and more specifically, to switching devices for selectively coupling multiple bus masters to slave devices such as memories.

2. Description of the Related Art

A crossbar switch is typically used in a processing environment to improve the efficiency of a data processing system. A crossbar switch acts as a switching network that selectively interconnects multiple bus masters to multiple slaves via a dedicated, point-to-point interface. The crossbar switch reduces problems associated with bus utilization, bus arbitration and may provide higher memory bandwidth.

A crossbar switching network has a predetermined number of masters and slaves. Any master may communicate with any slave via the crossbar switch. Conventional crossbar switch implementations using multiple slave ports map each slave port into a mutually exclusive address range from a per master point of view. Different master ports may have different address maps for the slave ports. However, from an individual master's point of reference, all of the slave ports are mapped to mutually exclusive locations.

When using a multiple ported slave device, such as a memory controller, conventional switching circuits such as crossbar switches are inadequate. This is due to the mutually exclusive address decoding causing significant access queuing.

BRIEF DESCRIPTION OF THE DRAWINGS

The present invention is illustrated by way of example and is not limited by the accompanying figures, in which like references indicate similar elements.

FIG. 4 illustrates in table form a control register contained within the crossbar switch configuration registers illustrated in FIG. 3;

FIG. 5 illustrates in table form another control register contained within the crossbar switch configuration registers illustrated in FIG. 3;

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figures 1, 2:
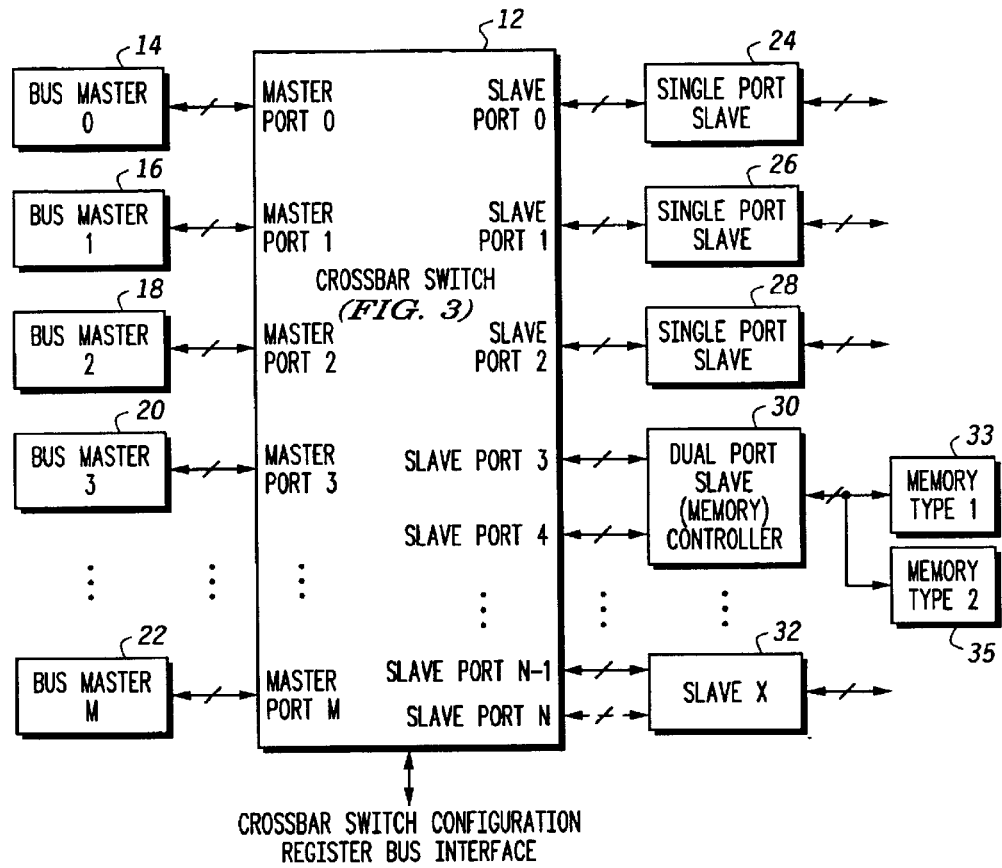
FIG. 1 illustrates in block diagram form a data processing system using a crossbar switch in accordance with the present invention.
FIG. 2 illustrates in text form a memory address mapping for some of the crossbar switch slave ports of FIG. 1.

Illustrated in FIG. 1 is a data processing system 10 that uses a crossbar switch 12 for interfacing a plurality of bus masters with a plurality of slave devices, at least one of which is a multiple port slave device. Crossbar switch 12 has a first port labeled "Master Port 0" that is coupled via a bi-directional interconnect with a bus master 14 labeled "Bus Master 0". A second port labeled "Master Port 1" is coupled via a bi-directional interconnect with a bus master 16 labeled "Bus Master 1". A third port labeled "Master Port 2" is coupled via a bi-directional interconnect with a bus master 18 labeled "Bus Master 2". A fourth port labeled "Master Port 3" is coupled via a bi-directional interconnect with a bus master 20 labeled "Bus Master 3". Any integer number M of master ports may be implemented within crossbar switch 12 and connected to bus masters. By way of example, an Mth master port is connected via a bi-directional interconnect with an Mth bus master 22 labeled "Bus Master M". The interconnect between each bus master may be a multiple conductor bus or may be a wireless interconnect.

Crossbar switch 12 has a plurality of slave ports connected to respective slave devices, at least one of which is a multiple port slave device. The slave devices may be any of numerous types of slaves such as a memory, a memory controller, a digital camera interface, a bus interface or other peripherals. A single port slave 24 is connected to a slave port 0 of crossbar switch 12 via a bi-directional interconnect. A single port slave 26 is connected to a slave port 1 of crossbar switch 12 via a bi-directional interconnect. A single port slave 28 is connected to a slave port 2 of crossbar switch 12 via a bi-directional interconnect. A dual port slave controller 30 has a first port connected to a slave port 3 of crossbar switch 12 via a bi-directional interconnect and has a second port connected to slave port 4 of crossbar switch 12. While dual port slave controller 30 is illustrated as a two-port slave, it should be understood that any number of multiple ports can be implemented. A dual port slave 32, labeled "Slave X", where X is an integer, has a first port connected to a slave port "N−1" of crossbar switch 12 via a bi-directional interconnect and has a second port connected to slave port N. Each of the slave devices, whether single port or multiple port, may have one or more input/output (I/O) terminals. Only the I/O terminal of the dual port slave controller 30 is illustrated as being connected via bi-directional interconnects to a first type memory 33 and a second type memory 35. Memory 33 and memory 35 function generally as storage circuitry and can be implemented with various types of memory. Various peripherals (not shown) may be connected to each of slaves 24, 26, 28 and 32. The peripherals may be other types of circuits than memory. It should be well understood that memory 33 and memory 35 may be implemented as any type of addressable memory, including but not limited to SRAM, DRAM, SDRAM, flash memory, ROM, etc. Crossbar switch 12 also has an input/output (I/O) that functions as a crossbar switch configuration register bus interface. The single port slaves 24, 26, 28, dual port slave controller 30 and slave X 32 each function as slave devices to any of the bus masters 14, 16, 18, 20 and 22. Memory 33 and memory 35 each function as a slave device to the dual port slave controller 30.

In operation, crossbar switch 12 functions to route and arbitrate requests within data processing system 10 from the numerous bus masters in order to read or write data from/to memory 33. In data processing system 10, any of the bus masters may request access to any of the crossbar slave ports. When more bus masters request access to any particular slave than the slave has free or available ports to dedicate, then crossbar switch 12 must arbitrate and control which bus master is allowed access to which slave port and when. Each access request from a bus master may contain a priority indicator or level. The use of priority information for arbitration is conventional and will not be discussed in detail. When multiple requests are made to a single port slave 24, the priority information is used to determine the order of which master gets access to the single port slave 24. When a higher priority access request from a bus master occurs during an existing access, the priority of the new access is determined by crossbar switch 12 and a determination is made whether or not the new access is given access to an occupied slave device and when. In conventional systems, since each slave is assigned to a mutually exclusive address range, if multiple masters request access to a same slave device at the same time, significant delay may be encountered.

Illustrated in FIG. 2 is a memory mapping illustrating the various address ranges associated with the slave ports of crossbar switch 12 of FIG. 1. Slave port 0 associated with single port slave 24, slave port 1 associated with single port slave 26, and slave port 2 associated with single port slave 28 have the designated addresses that are mutually exclusive from each other. In contrast, slave port 3 that is associated with dual port slave controller 30 and slave port 4 that is also associated with dual port slave controller 30 have an overlapping (shared) address range. In one form, the overlapping address ranges are the same address range but need not be completely overlapping. It should also be understood that the single port slave 24 connected to slave port 0 and the single port slave 26 connected to slave port 1 may be assigned overlapping or the same address range even though each single-ported slave interfaces through an input/output terminal to different peripheral devices (not shown).

Figure 3:
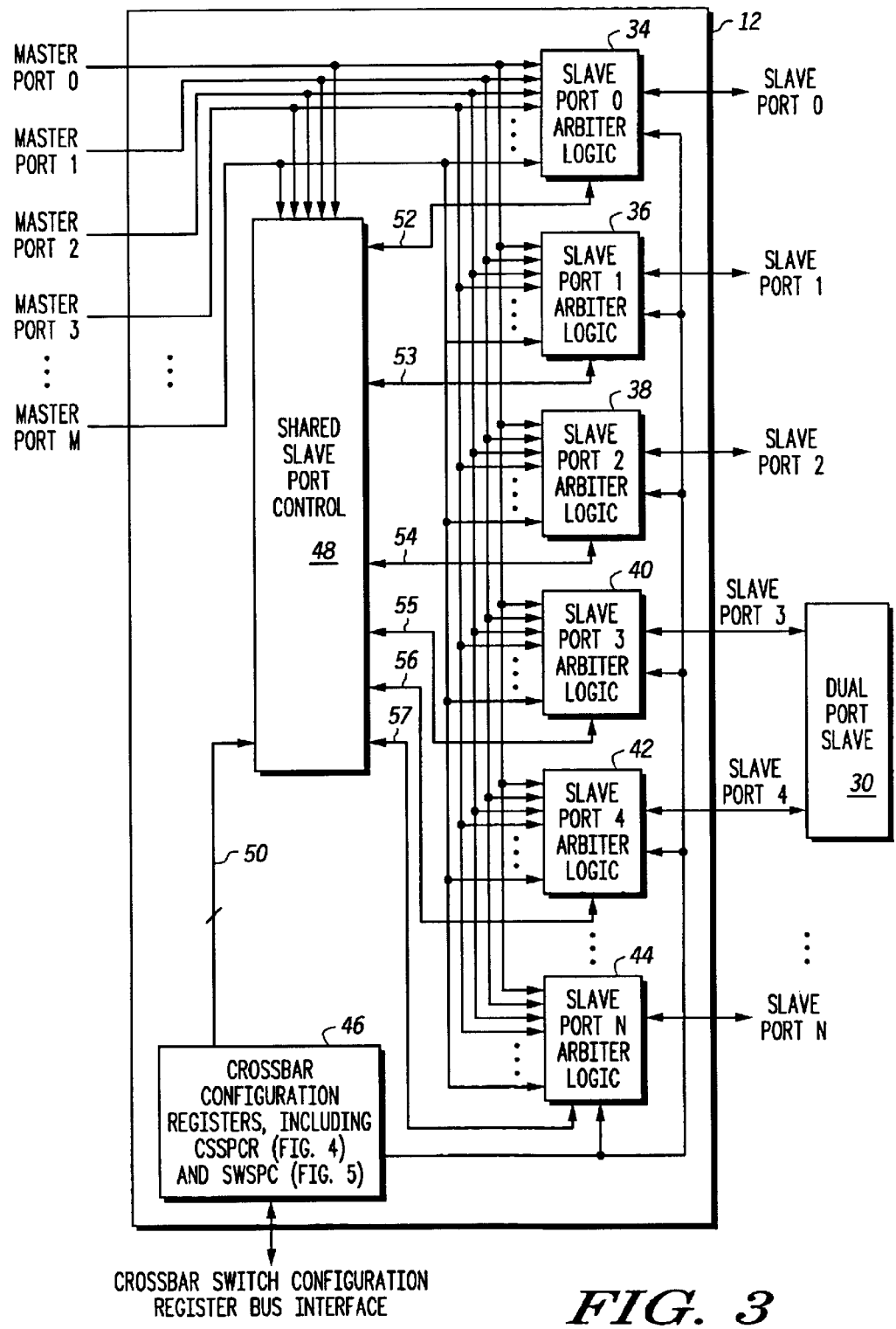
FIG. 3 illustrates in block diagram form further detail of the crossbar switch of FIG. 1.

Illustrated in FIG. 3 is a detail of crossbar switch 12 of FIG. 1. Crossbar switch 12 has a plurality of (N+1) slave port arbiter logic circuits, where N is an integer. For example, there is a slave port 0 arbiter logic circuit 34, a slave port 1 arbiter logic circuit 36, a slave port 2 arbiter logic 38, a slave port 3 arbiter logic circuit 40, a slave port 4 arbiter logic circuit 42 and a slave port N arbiter logic circuit 44. Each of the slave port arbiter logic circuits has a plurality of input/output (I/O) terminals connected to each master port from master port 0 through master port M. Crossbar configuration registers 46 are also contained within crossbar switch 12. The crossbar configuration registers 46 include a crossbar shared slave ports control register (CSSPCR) to be illustrated in FIG. 4 and a slave port wait-state prediction control register (SPWSPC) illustrated in FIG. 5. The crossbar configuration registers 46 have a first output connected to a control input of each of the slave port arbiter logic circuits 34, 36, 38, 40, 42 and 44 that provide a plurality of slave port arbiters. An I/O (input/output) of the configuration registers 46 is connected to a crossbar switch configuration register bus interface for, receiving configuration information from any predetermined bus master in data processing system 10. A third output of the configuration registers 46 is connected to an input of a shared slave port control circuit 48. The shared slave port control circuit 48 has inputs, each of which are respectively connected to a master port so that each of master ports 0 through M is connected to the shared slave port control circuit 48. A bidirectional interconnect 52 is connected between a first I/O of shared slave port control circuit 48 and an I/O of the slave port 0 arbiter logic circuit 34. A bidirectional interconnect 53 is connected between a second I/O of shared slave port control circuit 48 and an I/O of the slave port 1 arbiter logic circuit 36. A bidirectional interconnect 54 is connected between a third I/O of shared slave port control circuit 48 and an I/O of the slave port 2 arbiter logic circuit 38. A bidirectional interconnect 55 is connected between a fourth I/O of shared slave port control circuit 48 and an I/O of the slave port 3 arbiter logic circuit 40. A bidirectional interconnect 56 is connected between a fifth I/O of shared slave port control circuit 48 and an I/O of the slave port 4 arbiter logic circuit 42. A bidirectional interconnect 57 is connected between a sixth I/O of shared slave port control circuit 48 and an I/O of the slave port N arbiter logic circuit 44. Another I/O of slave port 0 arbiter logic circuit 34 is connected to slave port 0. Another I/O of slave port 1 arbiter logic circuit 36 is connected to slave port 1. Another I/O of slave port 2 arbiter logic circuit 38 is connected to slave port 2. Another I/O of slave port 3 arbiter logic circuit 40 is connected to slave port 4. Another I/O of slave port N arbiter logic circuit 44 is connected to slave port N. Slave ports 3 and 4 are each connected to a dual port slave controller 30. The remaining slave ports 0, 1, 2 and N are not illustrated as being connected to specific slaves because these slave ports are connected to any type of predetermined slave device.

In operation, master ports 0 through M communicate with the single port slave devices 0 through 2 in a conventional manner. Therefore, a detailed discussion of the accessing of the single port slave devices of data processing system 10 will not be provided. The discussion herein is directed to the accessing of the multiple port slave devices of the data processing system 10. In particular, the dual port slave controller 30 receives two access requests from any two of the bus masters 14, 16, 18, 20 and 22. Assume initially that each of slave ports 3 and 4 are available. If the two access requests are directed to a same page of memory 33, then the second request is not assigned to slave port 4 but rather is pended until the first access request to the same page completes on slave port 3. Thus, both accesses are assigned to slave port 3. In contrast, if the accesses are directed to different pages of memory 33, each access request is assigned one of the slave ports 3 and 4. While each of slave ports 3 and 4 are busy, assume that a third access request of dual port slave controller 30 from yet another of the bus masters in system 10 is received. At this point, crossbar switch 12 must determine which of currently occupied ports 3 and 4 to assign the new access request to. Conventional crossbar switches have priority configuration registers among crossbar configuration registers 46. This conventional circuitry is used to determine whether the new access has a higher or a lower priority than each of the currently executing accesses. If the new access request has a higher priority than one of the currently executing accesses, the new access request is steered or assigned to the slave port communicating with the lower priority master. If the new access request has a higher priority than both currently executing accesses, the new access request is steered or assigned to the slave port that is predicted to be available first as will be described below. In order to predict which slave port will be available first, two important pieces of information or arbitration criteria are used. The first is how many data beats exist in a burst transaction and the second is how many wait states per data beat exist. The number of clock cycles per data beat is equal to the number of wait states plus one. By multiplying these two criteria, a total length of a burst transaction may be determined. In one form, the shared slave port control circuit 48 evaluates as described below the number of data beats within an access transaction and the number of wait states per data beat in order to make a determination of slave port availability.

Illustrated in FIG. 4 is the crossbar shared slave ports control register (CSSPCR) of the crossbar configuration registers 46 of FIG. 3. In the illustrated form, this control register is implemented as a thirty-two bit register but other bit sizes may be implemented. The first eight bits, Bits 0 through 7, represent each of up to eight possible slave devices in a system. In particular, for each assigned slave device a zero indicates that the slave device does not have a shared memory region with multiple ports therein and a one indicates that the slave device does have a shared memory region with the multiple ports. The bits eight through eleven indicate the number of pages that are contained in memory mapping such as memory 33 of FIG. 1. The bits twelve through fifteen indicate the size of shared memory regions of the memory mapping of FIG. 2. The bits sixteen through thirty-one are grouped into pairs, labeled "MPx" for Master Profile. The master profile fields are for non-burst memory accesses and define the length of non-burst accesses for up to eight distinct non-bursting master devices. These bits are not used where burst accesses are used. It should be apparent that the CSSPCR register functions to provide information regarding whether there are shared slave ports and the size of the shared or overlapping memory regions of the shared slave ports. In addition, the CSSPCR register contains memory device page size information.

Illustrated in FIG. 5 is another control register, the slave wait-state prediction control (SPWSPC) register, of the crossbar configuration registers 46 of FIG. 3. Again, this control register is a thirty-two bit register but may be implemented with any number of bits. Bits zero through fourteen and sixteen through thirty are grouped into three-bit groups. It should be understood that the determination of how many bits per group and which of the thirty-two bit positions are used is an implementation choice. Each group contains encoded wait-state information for a predetermined slave device, up to ten slaves. The wait-state information is how many wait states exist between data beats in a memory burst. Various slaves have differing wait state characteristics. For example, bits zero through two (SLV0WS) contain wait state information for slave 24 connected to slave port zero. Similarly, bits nineteen through twenty-one (SLV6WS) contain wait state information for a slave (not shown in FIG. 1) connected to slave port six (not shown in FIG. 1). By way of example only, the following three-bit encodings may be used.

TABLE 1

| SL V0WS | Number of Port Wait States |
|---------|---------------------------|
| 000 | zero |
| 001 | one |
| 010 | two |
| 011 | three |
| 100 | four |
| 101 | five |
| 110 | six |
| 111 | DYNAMIC |

The three bit encodings permit up to seven predetermined wait state values to be programmed for any specific slave device. The encoding value 111 indicates a dynamic value meaning that the wait state information is dynamically determined for the slave. This feature allows flexibility for a system designer to use any one of various slave devices and to evaluate the wait state information on a real-time basis with the circuitry within shared slave port control circuit 48. In an alternative form, if only dynamic determination of the wait state information is desired, then the SPWSPC register of FIG. 5 is not required and all wait state information is dynamically determined within shared slave port control circuit 48.

Figure 6:
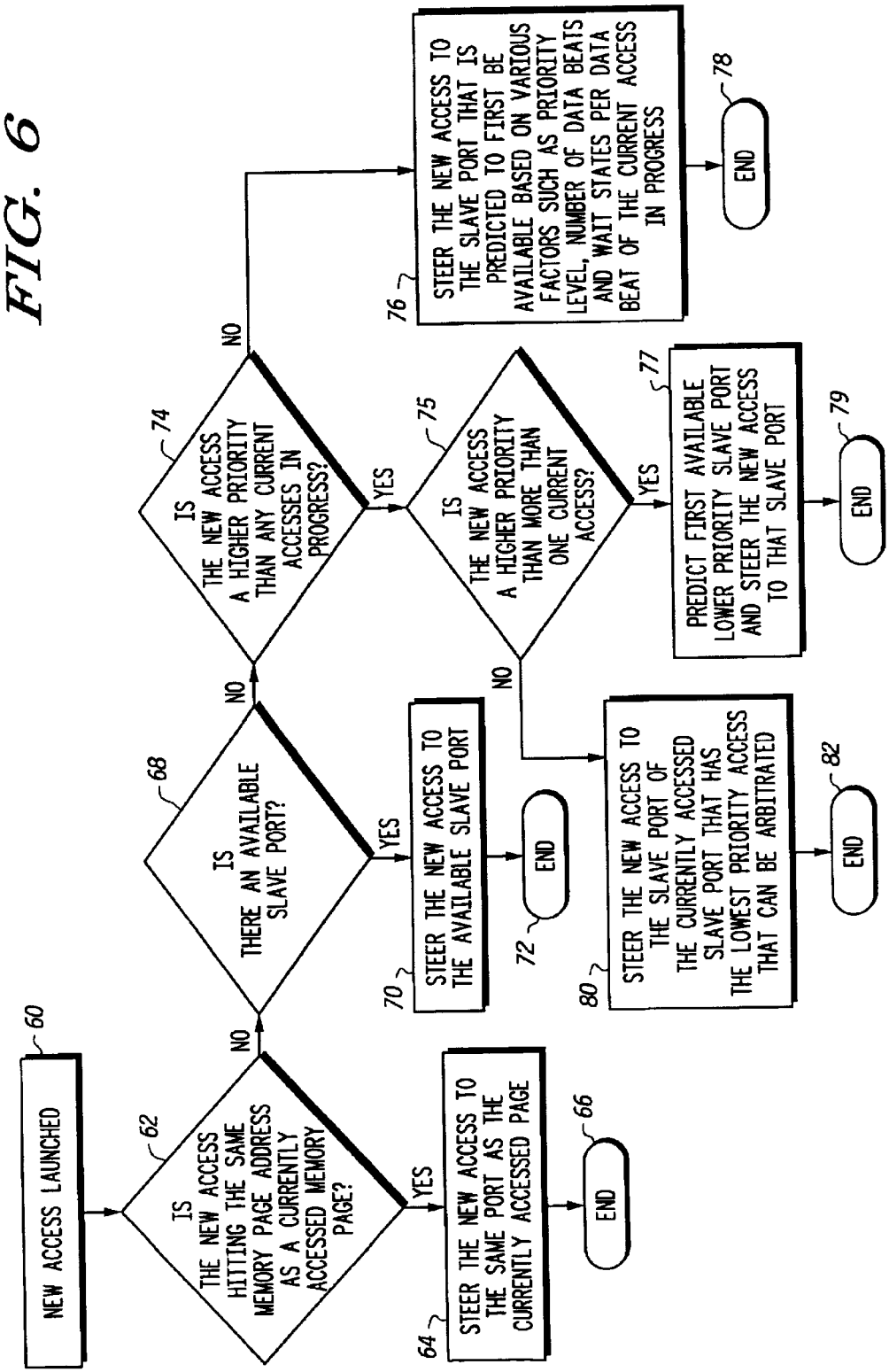
FIG. 6 illustrates in flowchart form a method of operation of a crossbar switch in accordance with the present invention.

Illustrated in FIG. 6 is a flowchart illustrating the method of operating crossbar switch 12. In a step 60 a new access is launched from one of the bus masters to one of the slave devices. The slave device targeted by the access is determined from an address decode operation according to the memory map of FIG. 2 that is performed by each of the slave port arbiter logic circuits 34, 36, 38, 40, 42 and 44. After the address decode, the transaction master and slave communication is established. Assume for discussion purposes that the FIG. 6 flowchart is an access to a multiple port slave device that is coupled to a memory, such as dual port slave controller 30 that is coupled to memory 33. However, the flowchart methodology applies equally to all slave devices in a system. In a step 62, a determination is made as to whether the new access is hitting a same memory page address as a currently accessed memory page. If the new access request is to a same page as a currently accessed memory page, then a step 64 is performed. In step 64, the new access is steered to the same port as the currently accessed page. At the conclusion of step 64, step 66 ends the new access arbitration and the system awaits a new access, if any, to be launched. If the new access request is not to a same page as a currently accessed memory page, then a step 68 is performed. In step 68 a determination is made as to whether there is an available slave port. If an available slave port exists, then a step 70 is performed. In step 70, the new access is steered to the available slave port and an end step 72 is subsequently executed. For example, if one of the slave port 3 or slave port 4 is available, the new access to the dual port slave controller 30 is steered to that available port. If both are available, it is an implementation choice as to which of the two available ports that the access is steered to. If an available slave port does not exist for the desired slave, then a step 74 is performed. In step 74, a determination is made as to whether the new access has a higher priority than any current accesses that are in progress for the desired slave. Conventional crossbar switch designs contain master priority level configuration registers within the crossbar configuration registers 46 of FIG. 3 that have not been specifically detailed. The determination and design implementation of priority level information is conventional and not further described herein. If the new access does have a higher priority, then a step 75 is performed. In step 75 another determination is made as to whether the new access has a higher priority than more than one current access. If the new access has a higher priority than only one current access, then a step 80 is performed. In step 80 the new access is steered to the slave port of the currently accessed slave ports that has the lowest priority access that can be arbitrated. For example, if both slave ports 3 and 4 are busy when a higher priority access to the dual port slave controller 30 occurs and the new access has a higher priority than the access using port 4 but not higher than the access using port 3, then the new access is steered to port 4. The current access using port 4 is allowed to complete and then the new access will be given use of port 4 at the earliest available point of arbitration.

If on the other hand the new access has a higher priority than more than one current access, then a step 77 is performed. In step 77 a prediction is made as to what will be the first available lower priority slave port. This prediction is made by knowing how many data beats is associated with each lower priority slave port. Burst length information is conventionally communicated within a chosen bus signal protocol. Any bus signal protocol may be used in connection with crossbar switch 12. For purposes of detailed explanation herein, the conventional and publicly documented AHB (Advanced High Speed Bus) protocol will be used. In that protocol, the control field that defines the transaction burst length is the HBURST[2:0] field. In other words, if the defined burst length is four as defined by HBURST equal to 010, then there are four data beats. The prediction is also made by knowing how many wait states exist between data beats for each lower priority access. The number of wait states varies according to the specific design of a slave device. A wait state on the AHB bus is defined as HREADY negated (not asserted). The SPWSPC register of FIG. 5 is defined to include the number of wait states for each slave port for the purpose of predicting the earliest available slave device. For example, for slave port 4, the SLV4WS[2:0] field defined by bits 14:12 of the SPWSPC register of FIG. 5 determines the number of wait states pursuant to the decoding of Table 1. Knowing the number of data beats and the number of wait states per data beat, the shared slave port control circuit 48 uses a conventional state machine (not shown) to determine the earliest available slave port. It should be well understood that the specific implementation of the state machine function and the associated control described herein may be implemented solely within the shared slave port control circuit 48 but this functionality may be distributed among the slave port arbiter logic circuits as well as partially within the shared slave port control circuit 48. The shared slave port control circuit 48 will steer the new access to the earliest available slave port arbiter logic circuit. Upon completion of this prediction and steering action, an end step 79 is performed. The control circuitry of FIG. 3 terminates the steps of FIG. 6.

If the new access does not have a higher priority than any current accesses that are in progress as determined in step 74, then a step 76 is performed. In step 76 the new access is steered to the slave port that is predicted to first be available based on various factors such as priority level, number of data beats, and the number of wait states per data beat of the current access that is in progress. The current access is allowed to complete and then the new access will be given use of the identified port at the earliest available point of arbitration. After steering the new access to the slave port that has been predicted to first be available, an end step 78 is performed.

Figure 7:
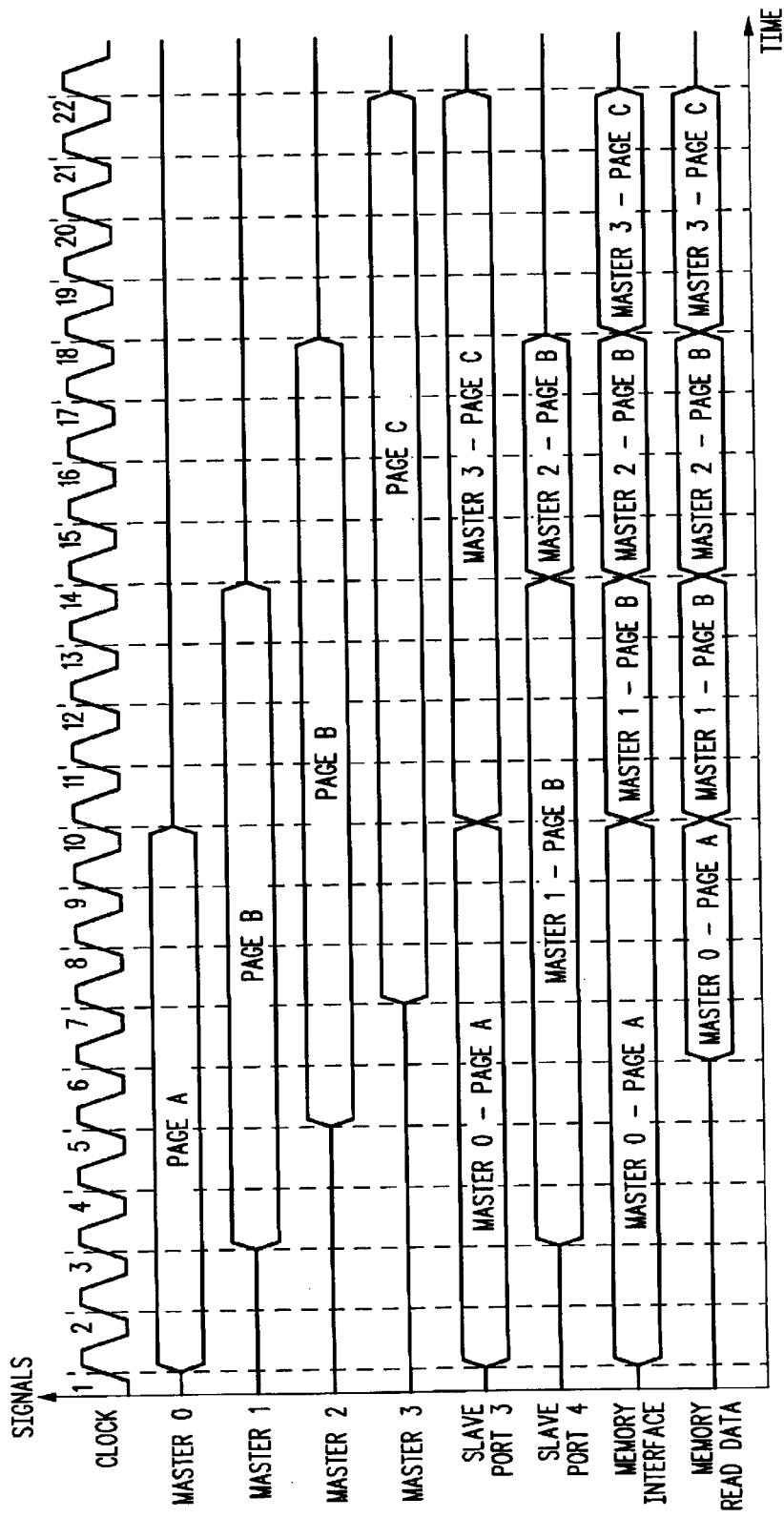
FIG. 7 illustrates in timing diagram form an example of accesses by multiple bus masters to pages of a memory in accordance with the present invention.

Illustrated in FIG. 7 is a timing diagram for one example of the operation of crossbar switch 12. For explanation purposes only, four accesses from four different masters are illustrated. Assume prior to clock 1 of this example that slave ports 3 and 4 are idle. Assume further that each bus master in this example is requesting a read burst of four data beats. It should be well understood that many other operational examples exist. The illustration however exemplifies the efficiency associated with crossbar switch 12. A series of repeating clock pulses having a predetermined period or duty cycle is illustrated. Each clock cycle or period is referred herein as a data beat. During clock pulses two through ten, bus master 14 asserts an access request for a memory page, Page A. During clock pulses four through fourteen, bus master 16 asserts an access request for a memory page, Page B. During clock pulses six through eighteen, bus master 18 asserts an access request for the same memory page, Page B. During clock pulses eight through twenty-two, bus master 20 asserts an access request for a memory page, Page C. Assume that in this example that all requests are made to the memory 33. Further, assume that all of the memory accesses are directed to memory 33 and that slave ports 3 and 4 have been programmed to be shared by the encoding of the SSP field of the CSSPCR register of FIG. 4. Assume that prior to Master 0's request of Page A, slave ports 3 and 4 are idle and available. Therefore, Master 0's request of Page A occurring first results in immediate access to the memory interface via Slave Port 3 beginning with clock cycle 2. Since master 1 is requesting access to a different page, Page B, the request of master 1 is immediately forwarded to the available slave port 4. Master 2 also requests Page B beginning at clock cycle six. At this point both slave ports 0 and 1 are busy. Since master 1 is already directed to slave port 1, master 2 will also be queued to slave port 1 since both master 1 and master 2 are requesting access to the same page, Page B, as described in step 64 of FIG. 6. In this example, assume that memory 33 is an SDRAM device having an initial access time of six clocks and a subsequent (page opened) access time of one clock. This characteristic is conventionally referred to as a "6-1-1-1" access for a four word data burst. As illustrated in FIG. 7, the dual port slave controller 30 can take advantage of simultaneous requests on Slave ports 3 and 4 to provide memory read data from Page A immediately followed by memory read data from Page B. Note that the initial access time of six clocks is only incurred once and is incurred during Master 0's access of Page A. The access to Page B by master 1 overlaps the access to Page A by Master 0, and thus the time required to open Page B in the SDRAM device can be hidden underneath the previous access to Page A. At clock eleven, the read data from Page B by master 1 is immediately available and is burst for the next four data beats. At clock fifteen, Master 2's read data from Page B is immediately available and is burst for the next four data beats. At clock nineteen, Master 3's read data from Page C is available and is immediately burst for the next four data beats. If limited by conventional crossbar switches and the AHB bus protocol, the accesses would occur sequentially and respectively take 6+1+1+1, 6+1+1+1, 1+1+1+1 and 6+1+1+1 accesses for a total number of thirty-one clocks. In this example, a total of twenty-one clocks (clocks 2 through 22) is required resulting in an efficiency improvement of ten clocks. The performance improvement is accomplished by hiding portions of the opened page accesses for Pages B and C. This is commonly referred to as "latency hiding". A crossbar switch with multiple slave ports where the ports have overlapping memory mapping as described herein is used to further optimize conventional memory controller latency hiding. In addition to a system performance increase, there is a significant decrease in the power consumed.

By now it should be appreciated that a crossbar switch with shared memory slave port mapping enables increased system performance. The performance increase is accomplished by intelligent access arbitration upstream of a dual port slave device such as a memory controller. Configuration registers have been described herein that can further optimize the determination of a first available slave port. By using data burst count and/or wait state information, an optimal determination may be made as to which busy slave port is the best candidate to direct a new access request to. It should be appreciated that while data processing system 10 is herein described in the context of burst memories with burst data, single data beat transfers having wait states may also be used within data processing system 10.

Although the method and structure taught herein has been disclosed with respect to certain specific steps and materials, it should be readily apparent that various alternatives may be used. For example, any type of semiconductor processes and circuitry may be used to implement crossbar switch 12 and data processing system 10. The data processing system 10 may be implemented on a single integrated circuit chip or as discrete semiconductors in a board level product. Also, the system may be geographically separated and implemented as a dispersed communication system. The memory mapping of FIG. 2 is exemplary and any memory ranges may be used wherein there is overlapping or the same memory address range shared by two or more slave ports. The configuration registers 46 are programmable in various ways. For example, configuration registers 46 may be statically configured upon power-up, programmed during a start-up or boot operation from a boot ROM, programmed based upon varying system conditions, or externally programmed by a user controlling an input to the data processing system 10. In another form of the method, when said access is higher in priority than at least two of said plurality of current accesses, step 77 may alternatively be implemented by determining which one of the at least two of said plurality of current accesses is lowest priority and selecting a slave port corresponding to said one of the at least two of said plurality of current accesses that is lowest priority. In yet another form, the lowest priority criteria is only used if it is determined that two or more of lower priority currently accessed slave ports will become available at about a same time or within a predetermined time range of each other.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the term "couple" is intended to cover direct connections as well as connections made via an intervening coupling element or elements. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A crossbar switch comprising:
a plurality of master ports, each of the plurality of master ports adapted to interface with a respective one of a plurality of bus masters;
a plurality of slave ports, each of the plurality of slave ports adapted to provide and receive information, at least two of the plurality of slave ports being assigned an overlapping address range to address one or more slave devices; and
control circuitry coupled to the plurality of master ports and the plurality of slave ports, the control circuitry using predetermined arbitration criteria to determine access to the plurality of slave ports when at least one access request to the overlapping address range occurs.

2. The crossbar switch of claim 1 coupled in a data processing system, the data processing system further comprising:
a plurality of slave devices, at least a first portion of the slave devices having multiple ports each of which is coupled to a predetermined different one of the plurality of slave ports and the multiple ports being assigned the overlapping address range.

3. The crossbar switch of claim 2 wherein the data processing system further comprises:
a peripheral coupled to at least one of the plurality of slave devices.

4. The crossbar switch of claim 3 wherein the peripheral is a memory.

5. The crossbar switch of claim 1 coupled in a data processing system, the data processing system further comprising:
a plurality of slave devices, at least a first portion of the slave devices having a single port coupled to a predetermined different one of the plurality of slave ports wherein a first single port is assigned the overlapping address range with a second single port of the slave devices of the first portion.

6. The crossbar switch of claim 1 wherein the control circuitry further comprises:
a configuration register for storing system operating characteristics for use by the control circuitry to determine a first available slave port when multiple slave ports with the overlapping address range are accessed while being busy.

7. A data processing system, comprising:
a plurality of masters, said plurality of masters including at least a first master and a second master, said first master initiating a first access and said second master initiating a second access;
a slave coupled to said plurality of masters, said slave having a plurality of ports, said plurality of ports including at least a first port and a second port;
shared storage circuitry coupled to said slave, wherein said first port and said second port of said slave access an overlapping address range in said shared storage circuitry; and
an arbiter coupled to said plurality of masters and said slave, said arbiter comprising control circuitry for providing arbitration criteria and wherein said arbiter receives said first access and said second access, and based on said first access, said second access, and said arbitration criteria, selects one of said first port and said second port.

8. The data processing system of claim 7, wherein said arbiter is a crossbar switch and said arbitration criteria provides information comprising at least one of a master priority level, a number of data beats, and a number of wait states per data beat.

9. The data processing system of claim 8, further comprising shared slave port control circuitry which evaluates said number of data beats within an access transaction and said number of wait states per data beat in order to make a determination of slave port availability.

10. The data processing system of claim 7, wherein said overlapping address range is a same address range.

11. The data processing system of claim 7, wherein said arbiter further comprises at least one configuration register, wherein said at least one configuration register indicates which one of said plurality of ports is to be shared by said plurality of masters, provides a non-burst access length for each one of said plurality of masters, provides a size of said memory, provides a number of pages of said memory, and a port wait state for each one of said plurality of ports.

12. The data processing system of claim 11, wherein said port wait state is programmed as dynamic and said arbiter determines said port wait state.

13. The data processing system of claim 7, wherein said control circuitry is programmable.

14. The data processing system of claim 7, wherein said arbiter further comprises:
a plurality of slave port arbiters coupled to said plurality of masters, each one of said plurality of slave port arbiters corresponding to one of said plurality of ports; and a shared slave port control circuit coupled to said plurality of slave port arbiters, wherein based on said arbitration criteria, said shared slave port control circuit selectively determines which of said plurality of ports is available first.

15. A data processing system, comprising:

a plurality of masters, said plurality of masters initiating multiple access requests;

a slave for being coupled to a peripheral device, said slave having at least a first port and a second port, wherein said first port and said second port use an overlapping address range to address said peripheral device; and a crossbar switch coupled to the plurality of masters and said slave, said crossbar switch selectively arbitrating for access to said first port and said second port of said slave when said multiple access requests from said plurality of masters occur to said overlapping address range assigned to said peripheral device.

16. The data processing system of claim 15, wherein said overlapping address range is a same address range.

17. The data processing system of claim 15, wherein said slave is a dual port slave.

18. The data processing system of claim 15, wherein said peripheral device is a memory.

19. A method in a data processing system, comprising:

initiating an access to a memory;

determining whether said access is hitting a memory page address that is a currently accessed memory page;

when said access misses a memory page address, determining whether there is an available slave port among a plurality of slave ports associated with a slave;

when there is not an available slave port, determining whether said access is higher in priority than any one of a plurality of current accesses corresponding to said plurality of slave ports;

when said access is higher in priority than any one of said plurality of current accesses, determining whether said access is higher in priority than at least two of said plurality of current accesses; and when said access is higher in priority than at least two of said plurality of current accesses, determining which one of the at least two of said plurality of current accesses is available first and selecting a slave port corresponding to said one of the at least two of said plurality of current accesses that is available first.

20. The method of claim 19, further comprising:

when said access is hitting said memory page address, steering said access to a port corresponding to said currently accessed memory page.

21. The method of claim 19, further comprising:

when there is said available slave port, steering said access to said available slave port.

22. The method of claim 19, further comprising:

when said access is higher in priority than only one of said plurality of current accesses, steering said access to a slave port corresponding to one of said plurality of current accesses that has a lower priority access that can be arbitrated.

23. The method of claim 19, further comprising:

when said access is a lower priority than any one of said plurality of current accesses, steering said access to a first available slave port based on at least one of a plurality of arbitration criteria, wherein said plurality of arbitration criteria provide criteria indicating at least one of a number of data beats, and a number of wait states per data beat.

24. The method of claim 19, further comprising implementing said slave as a dual port slave.

25. A data processing system, comprising:

a plurality of masters including at least a first master and a second master, said first master initiating a first access and the second master initiating a second access;

a plurality of slave devices including at least a first slave device and a second slave device;

storage circuitry coupled to the first slave device and the second slave device wherein the first slave device and the second slave device access the storage circuitry using an overlapping address range; and a crossbar switch coupled to the plurality of masters and the plurality of slave devices, the crossbar switch comprising control circuitry for providing arbitration criteria and wherein said crossbar switch receives the first access and the second access, and based on said first access, said second access, and the arbitration criteria, selects one of the first slave device and the second slave device.

26. A method in a data processing system comprising:

initiating an access to a memory;

determining whether said access is hitting a memory page address that is a currently accessed memory page, and if so, steering the access to a same port as the currently accessed page;

when said access misses a memory page address, determining whether there is an available slave port among a plurality of slave ports associated with a slave and steering said access to the available slave port;

when said access is higher in priority than any one of said plurality of current accesses, determining whether said access is higher in priority than at least two of said plurality of current accesses;

when said access is higher in priority than at least two of said plurality of current accesses, determining which one of the at least two of said plurality of current accesses is lowest priority and selecting a slave port corresponding to said one of the at least two of said plurality of current accesses that is lowest priority; and when said access is not higher in priority than at least two of said plurality of current accesses, steering said access to a slave port having a lowest priority access that can be arbitrated.

* * * * *